Nov. 30, 1926.                                                    1,609,210
F. SCHULZE
HARVESTING MACHINE
Filed April 7, 1926

INVENTOR
FRIEDRICH SCHULZE
BY Richards & Geier
ATTORNEYS

Patented Nov. 30, 1926.

1,609,210

UNITED STATES PATENT OFFICE.

FRIEDRICH SCHULZE, OF HAMBURG, GERMANY.

HARVESTING MACHINE.

Application filed April 7, 1926, Serial No. 100,283, and in Germany August 9, 1924.

This invention relates to harvesting machines for potatoes and other tubers or bulbs such as artichokes, and in particular to machines of this character in which the potatoes are arranged to be lifted, together with a certain amount of earth, by means of a share, separated from weeds, adhering earth and the like by means of a rotating member having radiating tines and deposited adjacent to the rotating member on the surface of the ground.

The main object of the invention is to effect a more thorough separation of the potatoes from earth, weeds and the like, and also to render more certain the disposal of the potatoes on the surface of the ground.

According to the present invention, the machine is so constructed that the tines of the rotating member cross the tines of a similar member positioned below it, so that a scissor-like or shearing action takes place between the tines of the two members, which together form a sort of coarse sieve, which triturates and passes the clods of earth and retains and carries the potatoes outwardly and deposits them on the surface of the ground.

The invention is illustrated in the accompanying drawings, in which—

Figure 1:
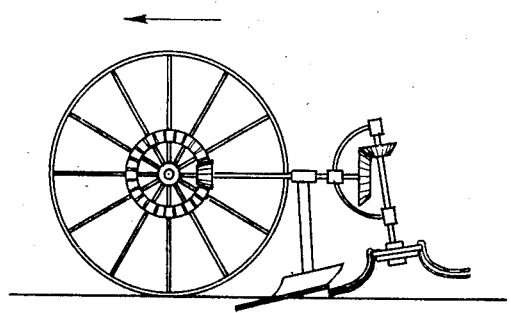
Fig. 1 is a diagrammatic elevation of the machine as a whole.
Figure 2:
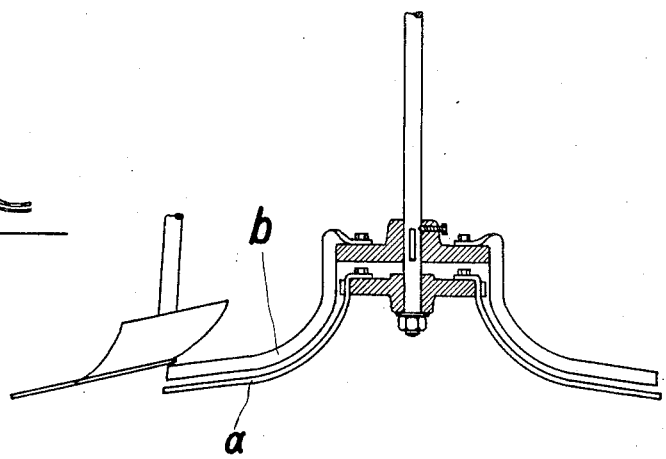
Fig. 2 is an enlarged vertical section of the share and sieve device.
Figure 3:
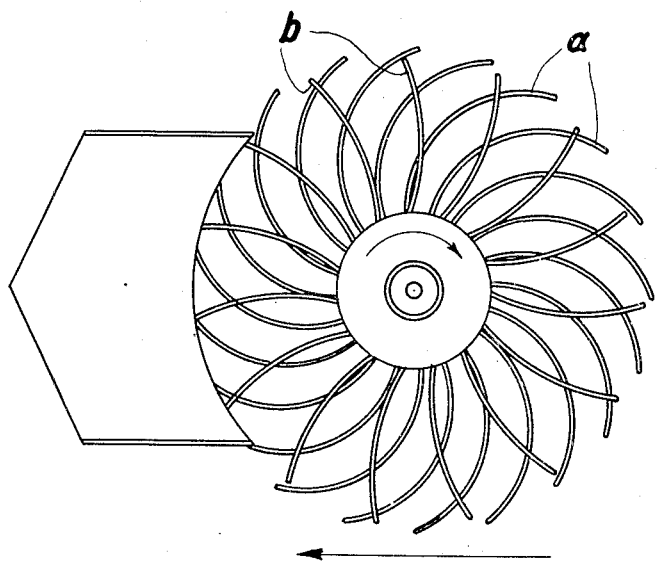
Fig. 3 is a plan view of Fig. 2.

Referring to the drawing, it will be seen that the shaft of the sieve device is arranged to be rotated by the axle of the running wheels and is mounted vertically or substantially vertically. Tines $a$ and $b$ on the sieve device extend under the rear end of the share, which is arranged to deliver the mixed potatoes and earth to the upper sifting element. As seen in Fig. 2, tines $a$ and $b$ are curved in a vertical plane so that they are spaced apart by a small vertical distance. Viewed in plan, the tines $a$ and $b$ are seen to be horizontally curved in opposite directions, that is, tines $a$ are curved in the direction of the arrow (Fig. 3), while tines $b$ are curved in the opposite direction.

The upper sifting member is arranged to be positively rotated in the direction of the arrow (Fig. 3) and the lower member is arranged to be frictionally rotated in the same direction by being journaled on, rather than keyed to, the shaft. The tines $a$ and $b$ may be straight, sinuous or angular in shape, according to preference, but it is essential that the tines $a$ should differ in shape or arrangement from tines $b$. Tines $b$ are preferably formed of flat straps disposed in vertical planes, as more thorough sifting is thus effected on account of the greater operative surfaces of the tines.

The rotating members are mounted so as to be capable of ready removal and of adjustment relatively to one another, such adjustment being provided for by mounting them in adjustable bearings.

In order that the sifting or separating action may be completed within a comparatively short period of time, the sieve device is inclined in such a manner that the earth is forced to mount it and heap up thereon.

The invention provides for a more rapid sifting or separating action as well as for a more effective disposal of the tubers on the surface of the ground, and may be applied to any harvesting machine for tubers or bulbs.

Having described my invention, what I claim as new and desire to secure by Letters Patent of the United States is:

1. In a harvesting machine, the combination of two superposed sifting members, positive means for rotating the upper of said sifting members, frictional means for rotating the lower of said sifting members, and a share adapted to deliver material to the upper of the sifting members.

2. In a harvesting machine, the combination of a share, a rotatable sifting member having tines radiating from its center, a second sifting member having radiating tines mounted above said first-mentioned sifting member in a position to receive material from said share, all of said tines being curved both horizontally and vertically, the horizontal curvatures of the tines of the respective sifting members being opposed to each other, and means for rotating said second sifting member.

3. In a harvesting machine, the combination of a share, a sifting member having horizontally curved tines radiating from its center, frictional means for rotating said sifting member, a second sifting member having oppositely horizontally curved radiating tines, said second sifting member being mounted above said first-mentioned sifting member in a position to receive material from said share, and positive means for rotating said second sifting member.

In testimony whereof I have hereunto set my hand.

FRIEDRICH SCHULZE.